United States Patent
Kozhaya et al.

(10) Patent No.: US 9,990,414 B2
(45) Date of Patent: Jun. 5, 2018

(54) COGNITIVE ARCHITECTURE WITH CONTENT PROVIDER MANAGED CORPUS

(71) Applicant: International Business Machines Corporation, Armonk, NY (US)

(72) Inventors: Joseph N. Kozhaya, Morrisville, NC (US); Christopher M. Madison, Charlotte, NC (US); Sridhar Sudarsan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 358 days.

(21) Appl. No.: 14/739,350

(22) Filed: Jun. 15, 2015

(65) Prior Publication Data

US 2016/0364449 A1 Dec. 15, 2016

(51) Int. Cl.
*G06F 17/30* (2006.01)

(52) U.S. Cl.
CPC .............. *G06F 17/30598* (2013.01)

(58) Field of Classification Search
None
See application file for complete search history.

(56) References Cited

U.S. PATENT DOCUMENTS

| | | | |
|---|---|---|---|
| 8,738,617 B2* | 5/2014 | Brown | G06F 17/30654 706/12 |
| 8,832,109 B2 | 9/2014 | Ghanea-Hercock et al. | |
| 9,633,317 B2* | 4/2017 | Gabel | G06N 5/022 |
| 2003/0187810 A1 | 10/2003 | Bromberg et al. | |
| 2005/0204184 A1 | 9/2005 | Endo | |
| 2007/0112696 A1* | 5/2007 | Vane | G06N 5/043 706/10 |
| 2007/0263936 A1* | 11/2007 | Owechko | G06K 9/00369 382/224 |

(Continued)

FOREIGN PATENT DOCUMENTS

| | | |
|---|---|---|
| CN | 102547735 A | 7/2012 |
| EP | 1 083 511 A2 * | 3/2001 |

(Continued)

OTHER PUBLICATIONS

Jerzy W. Rozenblit, "Cognitive Computing: Principles, Architectures, and Applications", 2005.*

(Continued)

*Primary Examiner* — Hung Le
(74) *Attorney, Agent, or Firm* — Jared C. Chaney

(57) ABSTRACT

A method for controlled sharing, in a cognitive computing system having a memory and a processor, of content from a variety of content providers may include receiving, by the cognitive computing system, an inquiry, wherein the inquiry is directed to at least one content topic. The method may then include identifying, by the cognitive computing system, the at least one content topic, and determining that a cognitive component of the cognitive computing system managed by a content provider has access to a content repository addressing the at least one content topic. The method may further include distributing, by the cognitive computing system, the inquiry to the cognitive component. The method may additionally include receiving a response from the cognitive component.

18 Claims, 4 Drawing Sheets

(56) References Cited

U.S. PATENT DOCUMENTS

| | | | |
|---|---|---|---|
| 2007/0265992 A1 | 11/2007 | Heidenreich et al. | |
| 2009/0228407 A1 | 9/2009 | Ramesh et al. | |
| 2011/0231349 A1* | 9/2011 | Stacy | G06N 5/022 706/12 |
| 2012/0078837 A1* | 3/2012 | Bagchi | A61B 5/00 706/52 |
| 2012/0078891 A1* | 3/2012 | Brown | G06F 17/30654 707/723 |
| 2013/0042302 A1* | 2/2013 | Chow | G06F 21/36 726/3 |
| 2014/0020089 A1* | 1/2014 | Perini, II | G06F 21/32 726/19 |
| 2014/0237331 A1 | 8/2014 | Brooks | |
| 2014/0297571 A1 | 10/2014 | Beamon et al. | |
| 2014/0379615 A1* | 12/2014 | Brigham | G06N 99/005 706/11 |
| 2014/0380285 A1* | 12/2014 | Gabel | G06N 5/022 717/139 |
| 2014/0380286 A1* | 12/2014 | Gabel | G06F 8/20 717/139 |
| 2015/0039536 A1 | 2/2015 | Cook et al. | |
| 2015/0100943 A1* | 4/2015 | Gabel | G06Q 30/02 717/106 |
| 2015/0339570 A1* | 11/2015 | Scheffler | G06N 3/04 706/16 |
| 2015/0356424 A1* | 12/2015 | Sanchez | G06N 5/04 706/14 |
| 2015/0356427 A1* | 12/2015 | Sanchez | G06F 17/30539 706/55 |
| 2015/0356431 A1* | 12/2015 | Saxena | G06N 5/04 706/12 |
| 2017/0140275 A1* | 5/2017 | Sanchez | G06N 5/02 |
| 2017/0294139 A1* | 10/2017 | Cordova | G09B 19/167 |

FOREIGN PATENT DOCUMENTS

| | | |
|---|---|---|
| WO | WO 2011127424 A1 * | 10/2011 |
| WO | 2013101143 A1 | 7/2013 |
| WO | 2013123445 A1 | 8/2013 |

OTHER PUBLICATIONS

Iandoli et al., "Modelling Networked Cognition: A Socio-Computational Approach", The Development of Theoretical Fundaments of Knowledge Ecosystems and Their Applications on Economy and Healthcare, Research Grant PNII-IDEI 810/2008. Department of Business and Managerial Engineering, University of Naples, Italy. pp. 1-21.

* cited by examiner

COGNITIVE ARCHITECTURE WITH CONTENT PROVIDER MANAGED CORPUS

BACKGROUND

The present disclosure relates to distributed computing, and more specifically to an architecture for a cognitive computing system having a distributed corpus with cognitive components managed by content providers.

Cognitive computing systems may include Question and Answer Systems where a cognitive computer system is provided a question, and the system provides a response in the form of, for example, a hypothesis supported by evidence or a certain confidence score. Cognitive computing systems may improve the quality of the computer system's responses (e.g., the accuracy of their hypothesis and the level of confidence in the hypotheses) by ingesting content or data provided from disparate content providers.

SUMMARY

According to embodiments of the present disclosure, a method for controlled sharing, in a cognitive computing system having a memory and a processor, of content from a variety of content providers may include receiving, by the cognitive computing system, an inquiry, wherein the inquiry is directed to at least one content topic. The method may then include identifying, by the cognitive computing system, the at least one content topic, and determining that a cognitive component of the cognitive computing system managed by a content provider has access to a content repository addressing the at least one content topic. The method may further include distributing, by the cognitive computing system, the inquiry to the cognitive component. The method may additionally include receiving a response from the cognitive component.

Other embodiments are directed to a system and a computer program product.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
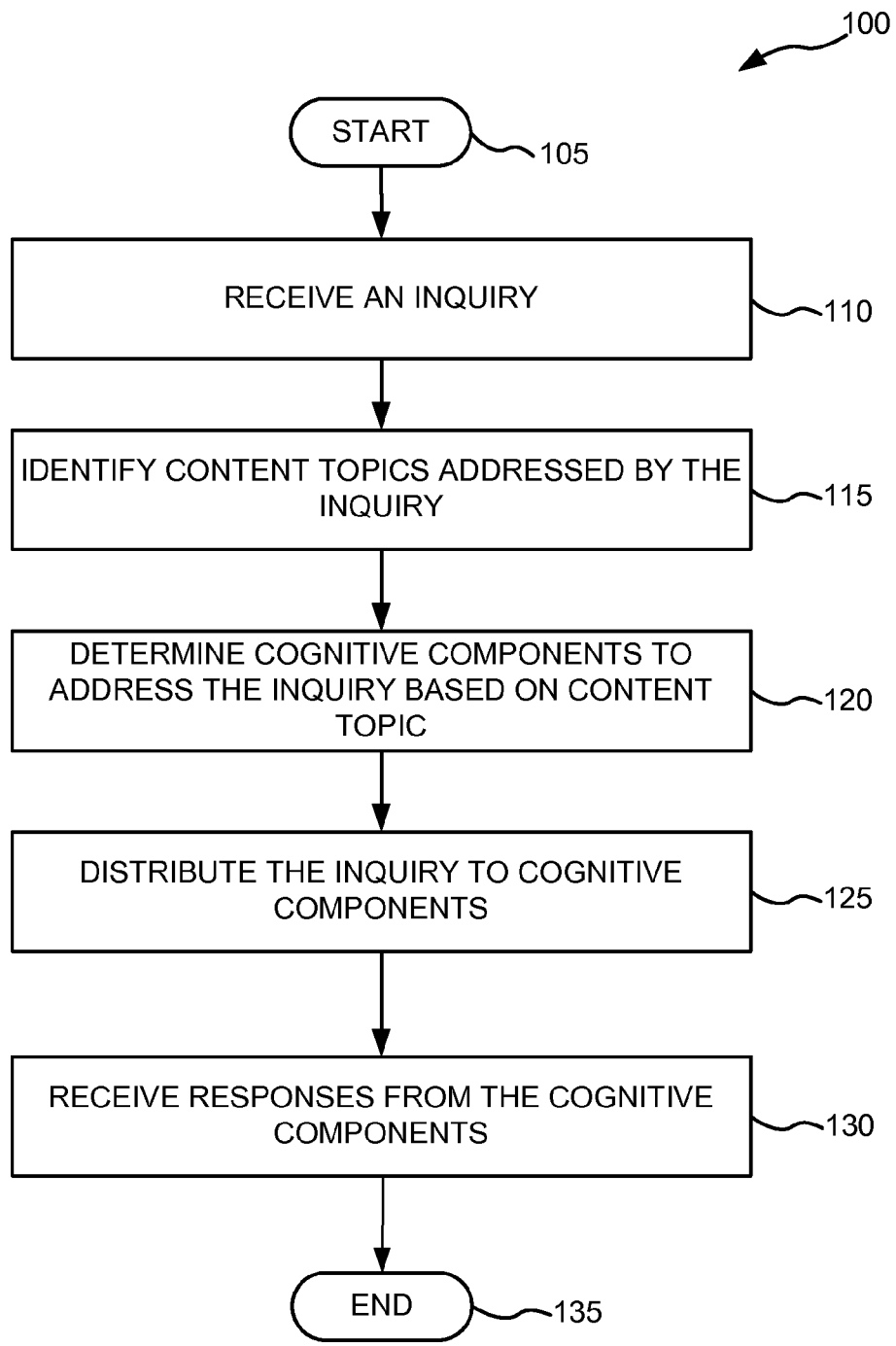
FIG. 1 depicts a flowchart of a set of operations for operating a distributed cognitive computing system, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to distributed computing, more particular aspects relate to an architecture for a cognitive computing system having a distributed corpus with cognitive components managed by content providers. While the present disclosure is not necessarily limited to such applications, various aspects of the disclosure may be appreciated through a discussion of various examples using this context.

Cognitive computing systems refer to a category of technologies that use natural language processing and machine learning to enable people and machines to interact more naturally. A Cognitive computing system (CCS) may use arrays of machine learning tools, including, for example, pattern recognition, hypothesis generation, evidence gathering and scoring, to draw on an available corpus of knowledge to discover new insights and answers addressing inquiries presented to the CCS. The corpus of a CCS may be an internal representation (internal to the CSS) of the body of knowledge available to a CCS. A corpus may include content (e.g., data, research, academic studies, and reports) covering topic areas that the CCS is designed to address. The content may be supplied by disparate entities (e.g., content providers) that may produce and maintain content repositories, and who may have an interest in the CCS. Content that is ingested into the corpus of the CCS may be used by the CCS to provide responses to inquiries directed at topics covered by the content. Embodiments of the present disclosure are based on the recognition that content providers may want to control access to, and the distribution of, their content in a cognitive computing system.

Embodiments of the present disclosure are directed towards an architecture (e.g., systems, methods, and computer program products) for operating a distributed cognitive computing system where the corpus, including cognitive components, are managed by content providers. The architecture may include receiving a natural language inquiry directed to one or more content topics. A natural language inquiry (e.g. a question) may be expressed using natural speech (e.g., speech that two human beings might use when interacting with each other). A content topic may be any subject matter which a corpus of a distributed CCS has content to address or support. The architecture may then include classifying the inquiry into one or more content topics. The architecture may also include identifying cognitive workers, associated with disparate content provider's content, that are enabled to address inquiries directed to at least one of the content topics. The architecture may further include distributing the inquiry to the identified cognitive workers for processing, and aggregating the responses returned from cognitive workers.

Cognitive computing systems may include both natural language processing (NLP) and machine learning cognitive components. The natural language processing components may receive an inquiry from, for example, a user, and process the received inquiries into internal representations that may be receivable by the cognitive components. The cognitive components may interface with a corpus of a CCS to generate hypotheses, collect evidence in support of the hypotheses, and then score (e.g., rank) the hypotheses and evidence according to the level of confidence the CCS has in each hypothesis. A hypothesis generated by the cognitive components may be a guess at the answer to an inquiry. Evidence in support of a hypothesis may include facts, data patterns, or other data available in the corpus. Scoring may include the process of ranking hypotheses and evidence according to their weight. The weight can depend on the amount of support available for each content topic.

As used herein, a node may be a single computer, or a cluster of networked computers configured to perform one or more tasks.

Embodiments of the present disclosure are directed towards architecture for a distributed CSS that can be partitioned into a cognitive controller and a plurality of distributed modules. The cognitive controller may include the NLP components of the distributed CSS as well as components for classifying and distributing inquiries to cognitive workers. The cognitive controller may further include components for receiving and merging responses from cognitive workers. Each of the distributed modules may be a "cognitive worker" (e.g., a one or more computing nodes with associated software applications for performing a unit of work on behalf of the distributed CSS). The unit of work may include generating answers to inquiries received by the distributed CSS. A cognitive worker may be managed by a content provider, and may include the cognitive components of the distributed CSS. A cognitive worker may provide the distributed CSS an interface to a corpus generated from the content hosted by a managing content provider. The content providers may regulate access to the cognitive workers, and hence, access to the corpus (or a portion of the virtual corpus) derived from content owned by a content provider.

Collectively, a set of distributed cognitive workers may form a virtual (or distributed) corpus managed by a cognitive controller. The cognitive controller may provide a single interface to receive, classify, and distribute inquiries to the cognitive workers of the virtual corpus. Additionally, the cognitive controller may aggregate responses from the virtual corpus and provide a single interface for returning results to inquiries. The cognitive workers of the virtual corpus may perform the tasks of hypotheses generation, evidence gathering, and scoring.

Referring now to the figures, FIG. 1 depicts a flowchart 100 of a set of operations for operating a distributed cognitive computing system, according to various embodiments. The operations depicted in the flowchart 100 may be executed by a distributed CCS as embodied, for example, in one or more scripts or applications executing on a cognitive controller, as described herein.

A cognitive controller may begin the operation of the distributed CCS at operation 105 by associating with one or more cognitive workers. According to various embodiments, a cognitive worker may exist in one of four association states with respect to the cognitive controller: unassociated, register, associated, and deregister. A cognitive worker that is introduced to a distributed CCS may start in the unassociated state. In some embodiments, a cognitive controller may be aware of the existence of an unassociated cognitive worker, but the cognitive controller may not be able to communicate with, and thus may not be able to distribute inquiries to, the unassociated cognitive worker. Consequently an unassociated cognitive worker may not constitute a component of the virtual corpus of a distributed CSS.

An unassociated worker may transition from the unassociated state to the register state. In some embodiments, the transition to the register state may be initiated by a cognitive controller in an attempt to, for example, establish communications with a cognitive worker. A cognitive controller may initiate the transition to the register state in response to determining that a cognitive worker has access to a content repository addressing at least one content topic of an inquiry being processed by the distributed CCS. A cognitive controller may determine that a cognitive worker has access to a content repository addressing a given content topic by accessing a database of available content topics associated with a cognitive worker. A cognitive controller may also initiate the transition to the register state in response to determining that a cognitive worker has a history of providing responses to inquiries addressing certain content topics with a given or desired level confidence.

In certain embodiments, the transition to the register state may be initiated by a content provider, for example, granting the distributed CCS access to the corpus of a cognitive worker. A cognitive worker in the registration state may indicate that a cognitive controller is in the process of executing a handshake with the cognitive worker. The handshaking process may include verification of communication, including, for example, establishing a set of protocols that may be used for communication. The handshaking process may additionally include a cognitive controller receiving from a cognitive worker a set of content topics on which the cognitive worker is able to process inquiries. A cognitive controller may construct a database of content topics, including the content topics received for each cognitive worker. A cognitive controller may use the set of topics during inquiry classification (e.g., content topic identification), described infra.

At the completion of the handshaking process, a cognitive worker may transition to the associated state. An associated cognitive worker may be considered part of a virtual corpus of a CCS. The CCS may not directly access the corpus of an associated worker, but the cognitive controller may consider an associated cognitive worker and corresponding content topics when executing succeeding operations of the flowchart 100.

An associated cognitive worker may transition from the associated state to the deregister state by action of the cognitive controller or the content provider. The cognitive controller may initiate the transition of a cognitive worker to the deregister state when, for example, when there is a communication failure between the controller and the cognitive worker. The cognitive controller may also initiate a transition to the deregister state when the cognitive controller is directed to initiate the transition by a user or an occurrence of a programmed event (e.g., when a ranking of a cognitive controller falls below a threshold). In some embodiments, a content provider may initiate a transition to the deregister state to, for example, revoke access to the corpus of a cognitive worker. During the deregistration state, a cognitive controller may purge the set of content topics associated with a cognitive worker (or the associations between a cognitive worker and a set of content topics) from the distributed CCS. A cognitive worker may automatically transition from the deregister state to the unassociated state.

The cognitive controller may execute operation 110 by receiving an inquiry for processing. The inquiry may be received from a user interface, a communication network, or a computer readable media. Additionally, the inquiry may be received in the form of a natural language question. An example inquiry may be, "what type of vehicle is best to take camping in the mountains?"

A cognitive controller may then execute operation 115 by identifying content topics addressed by an inquiry. Identifying content topics addressed by an inquiry may include analyzing the natural language inquiry in order to understand what is being asked. The process may include recognizing the syntactic and semantic schemes around which the natural language inquiry is organized, and then disassembling and parsing the inquiry into a representation that the CCS can understand. The cognitive controller may then use available tools, such as semantic analysis and logical inference tools, to discern the meaning of the inquiry and the content topics to which the inquiry is addressed. The process may include comparing hundreds of thousands of sematic relations and generating and weighing millions of logical inferences.

Executing operation 115 may further include classifying the inquiry, or components of the inquiry, according to a set of content topics stored in a database of content topics received for cognitive workers. Classifying the inquiry may include segmenting or parsing the inquiry for its constituent components (e.g., sub-inquiries), and analyzing the constituent components to determine how closely each component relates to a stored content topic. In some embodiments, the constituent components may be assigned a score indicating the closeness of the relationship to a stored content topic. Referring to the example inquiry previously presented, relevant content topics stored in a database of content topics of a cognitive controller may include military vehicles, recreational vehicles, aviation, troop transportation, or recreational excursions. A cognitive controller receiving the example inquiry may automatically assign the inquiry a score associated with each content topic based on how closely the subject matter of the inquiry relates to a content topic. Scores associated with recreational vehicles and recreational excursions may be higher than scores associated with military vehicles, troop transportation, and aviation.

A cognitive controller may continue flowchart 100 by executing operation 120. Executing operation 120 may include determining, by a cognitive controller, at least one cognitive worker that is enabled to address the received inquiry. A cognitive worker that is enabled to address the received inquiry may be an associated cognitive worker that may provide an answer with the highest confidence score. A cognitive controller may maintain, in addition to a database of content topics, a database including a number of metrics that may be used to prioritize cognitive workers. The database may include, for example, user feedback, a history of confidence ratings of the cognitive worker's response to inquiries on a topic, and a table of content topic restrictions imposed by content providers. Cognitive workers that have a history of providing the best answers (e.g., as determined by confidence in the answer, and user feedback), or that have fewer content provider restrictions on a particular topic may be prioritized higher than other workers.

A cognitive controller may first identify a set of candidate cognitive workers. The set of candidate cognitive workers may include those cognitive workers having registered content topics that correspond with topics addressed by the inquiry. The cognitive controller may then select a candidate based on a priority determined by, for example, how closely related the inquiry is a topic associated with a candidate cognitive worker, and a candidate cognitive worker's history of addressing inquiries on a given topic (e.g., a history of providing responses to inquiries with a threshold confidence score).

A cognitive controller may further continue the operation of the flowchart 100 by executing operation 125. Executing operation 125 may include distributing an inquiry to cognitive workers. A cognitive controller may dispatch the inquiry to one or more of the candidate cognitive workers selected in operation 120. In some embodiments, a representation of the inquiry generated in operation 115 may be distributed to one or more selected candidate cognitive workers over, for example, a data communications network. A selected candidate cognitive worker may receive and process the inquiry before providing a response to the cognitive controller. Processing the inquiry may include analyzing the language of the inquiry to understand what question is being asked. The processing may further include inferring or deriving an answer (e.g., generating one or more hypothesis) to the inquiry by applying the results of the analysis to the corpus of the cognitive worker via an array of reasoning and evidence gathering algorithms. The cognitive worker may associate a confidence score with each inferred answer. The confidence score may indicate a level support (or magnitude of evidence) available in a corpus of the cognitive worker for the inferred answer. The selected candidate cognitive worker may then forward each inferred answer and confidence score to a cognitive controller.

In some embodiments, a selected candidate cognitive worker may reject the inquiry (e.g., abandon the processing of the inquiry) if the cognitive worker determines, from the processing, that resolving the inquiry may require access to the corpus in a way that violates one or more content access criteria provided by a content provider. A content access criteria may be a contract, such as a licensing agreement, between an administrator or client of a distributed CCS and one or more content providers. The licensing agreement may enable content providers to charge different fees for different access to their content. A licensing agreement may, for example, enable a content provider to charge a first fee for access to a first content repository and change a second fee for access to a second content repository. A content access criteria based on such a licensing agreement may enable a cognitive worker to process inquiries that require access to the first content repository when the first fee is paid, while rejecting inquires that require access to the second content repository when the second fee is not paid.

In some embodiments, a cognitive controller may determine a priority for associating with, or distributing inquires to, a cognitive worker according a content access criteria implementing a licensing agreement. A cognitive controller, for example, may distribute inquiries to a first set of cognitive workers having access to content repositories with the lowest access fee rates. The cognitive controller may then, in response to determining that responses provided by first set of cognitive workers have confidence scores below a threshold value, distribute inquiries to a second set of cognitive workers having access to content repositories at higher access fee rates.

Operation 130 may include receiving one or more responses for the cognitive workers. In some embodiments, operation 130 may further include aggregating and merging the received responses. Aggregating the received responses may include automatically organizing the responses in a table that is in a memory of the cognitive controller. The responses may be organized according to a confidence score associated with the responses. In some embodiments, a cognitive controller may merge responses from multiple controllers into a one or more coherent answers to the inquiry.

The flowchart 100 may end at operation 135. A cognitive controller may execute operation 135 by providing an answer to an inquiry along with a confidence score via, for example, a graphical user interface.

Figure 2:
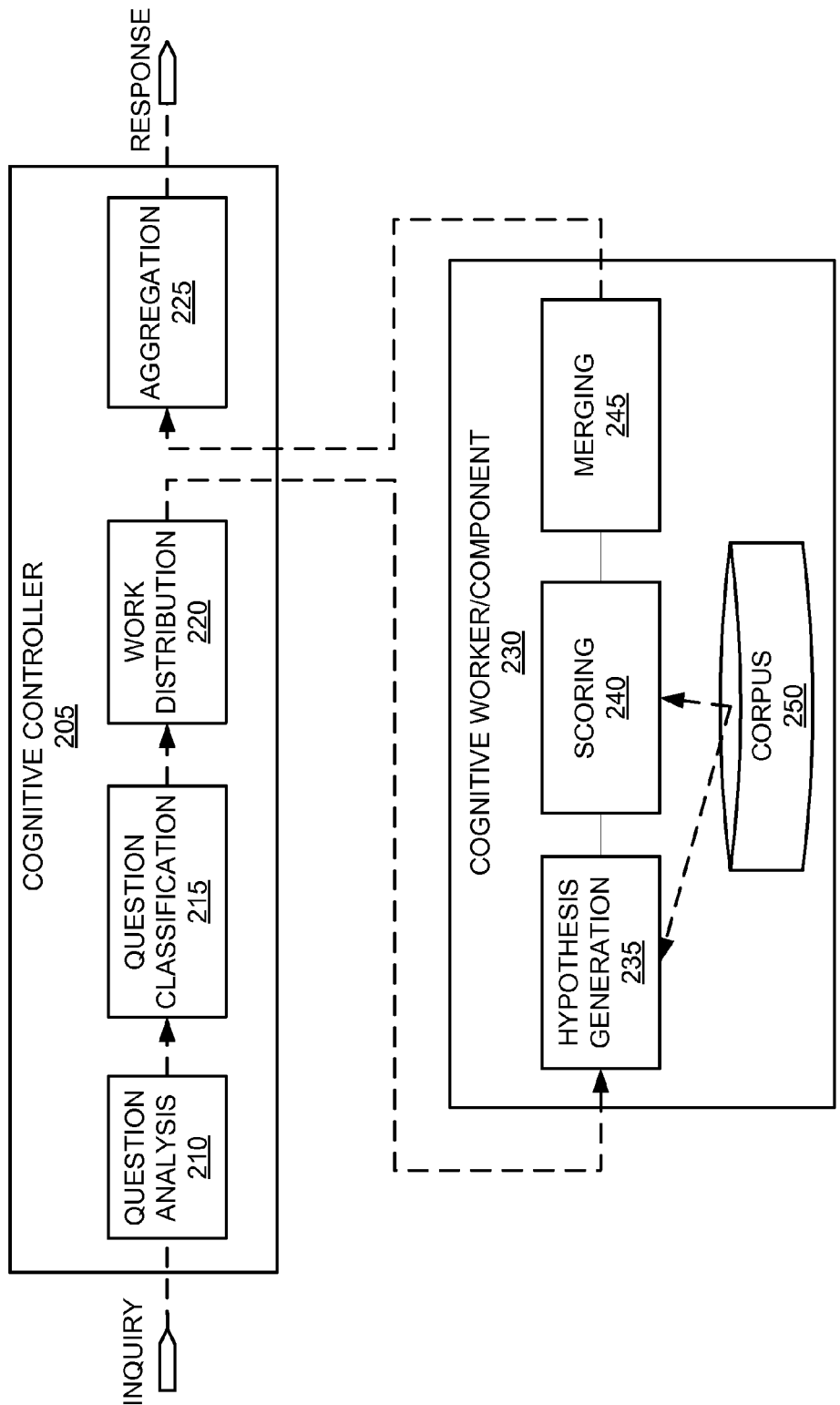
FIG. 2 depicts a block diagram of the components of a cognitive controller and a cognitive worker, according to various embodiments.

FIG. 2 depicts a block diagram of the components of a cognitive controller 205 and a cognitive worker 230, according to various embodiments. The cognitive controller 205 and the cognitive worker 230 may include one or more computing devices, such as the computing device 400 shown in FIG. 4. The cognitive controller 205 may further include question analysis component 210, question classification component 215, work distribution component 220, and aggregation component 225. The cognitive worker 230 may include hypothesis generation component 235, scoring component 240, merging component 245, and corpus component 250.

The cognitive controller 205 may include one or more management scripts or applications that orchestrate the interactions of the constituent components of the cognitive controller with each other and with the cognitive workers 230. Each component of the cognitive controller 205 may be a process executing on one or more computing devices. The processes may include one or more algorithms and applications for executing a function of the component.

The question analysis component 210 may receive an inquiry directed to one or more content topics. The question analysis component 210 may analyze the received inquiry to understand what question is being asked, as described, for example, in the discussion of operations 110 and 115 of FIG. 1. The question analysis component 210 may then provide an internal representation of the inquiry to the question classification component 215.

The question classification component 215 may receive an internal representation of an inquiry from the question analysis component 210 via, for example, inter-process communication or a data communication network. The question classification component 215 may analyze the internal representation of the inquiry using, for example, question analysis algorithms and products, to identify content topics to which the inquiry is directed. The question classification component 215 may then classify the inquiry according the identified content topics. In some embodiment, the question classification component 215 may provide a confidence score that can indicate a degree to which the inquiry matches a given content topic (e.g., an indication of how much support the cognitive controller has for inferring that the inquiry is directed to a given topic). The question classification component 215 may then provide the classified inquiry, content topics, and confidence scores to the work distribution component 220.

The work distribution component 220 may receive a classified inquiry, content topics, and associated confidence scores from the question classification component 215 for distribution to one or more cognitive workers. The work distribution component 220 may cross-reference the received content topics with a database of content topics supported by associated cognitive workers to determine a set of candidate cognitive workers that may address the inquiry. One or more cognitive workers may then be selected from the set of candidate cognitive workers based on, inter alia, a priority assigned to each cognitive worker, as described herein. The work distribution component may then distribute the inquiry, including content topics, to one or more cognitive workers 230. The inquiry and content topics may be distributed to the cognitive workers 230 in, for example, a data structure or file over a data communication network.

The aggregation component 225 may receive responses to an inquiry from one or more cognitive workers 230. The responses may include a confidence score, as described herein. The aggregation component 225 may then aggregate (e.g., including sorting and merging) the received responses, as described in the discussion operation 130 of FIG. 1. The aggregation component 225 may then provide an answer to the inquiry based on the received responses, as described in the discussion of operation 130 of FIG. 1.

The cognitive worker 230 may include one or more management scripts or applications that may orchestrate the interactions of the constituent components of the cognitive worker with each other and with the cognitive controller 205. Each component of the cognitive worker may be a process executing on one or more computing devices. The processes may include one or more algorithms and applications for executing a function of the components of the cognitive worker 230.

The hypothesis generation component 235 may receive an internal representation of an inquiry from a cognitive controller 205 (e.g., from the work distribution component 220 of the cognitive controller). The hypothesis generation component 235 may analyze the received inquiry and generate one or more hypotheses (e.g., inferred or derived potential answers), as described during the discussion of operation 125 of FIG. 1. The hypothesis generation component 235 may then provide the one or more hypotheses to scoring component 240.

The scoring component 240 may receive one or more hypothesis from the hypothesis generation component 235. The scoring component 240 may then access the corpus 250 to gather evidence supporting each hypothesis. The evidence may then be used to provide an initial confidence score for the each hypotheses. The scoring component 240 may then provide the hypotheses and initial confidence scores to the merging component 245.

The merging component 245 may receive hypotheses and associated confidence scores from scoring component 240 for aggregation and merging. The aggregation and the merging may include generating a table or list of hypotheses ordered according to confidence scores. The aggregating and the merging may further include combining responses and generating final confidence scores for each hypotheses. The merging component 245 may then provide the hypotheses and final confidence scores to cognitive controller 205.

The corpus component 250 may represent the available set of knowledge accessible to cognitive worker 230. The corpus component 250 may include databases, algorithms, network graphs, and other data and machine learning components derived from content supplied by a content provider. The corpus component 250 may be accessed and made available to a distributed CCS though the hypothesis generation component 235 and the scoring component 240.

Figure 3:
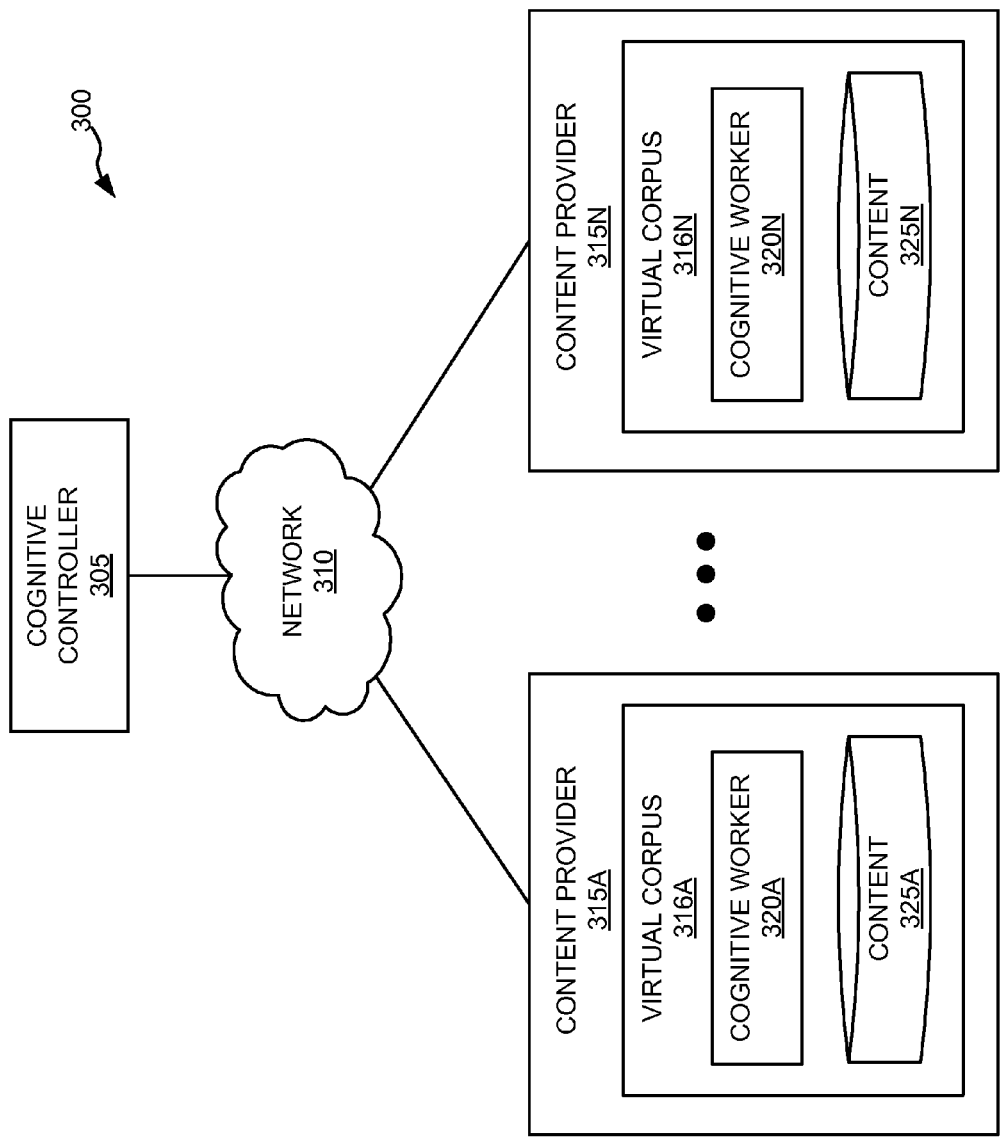
FIG. 3 depicts a block diagram of a distributed cognitive computing system having a distributed virtual corpus with cognitive components managed by content providers, according to various embodiments.

FIG. 3 depicts a block diagram of a distributed cognitive computing system 300 having a distributed virtual corpus with cognitive components managed by content providers, according to various embodiments. The cognitive computing system 300 may include cognitive controller 305, data communication network 310, and a set of content providers 315A through 315N. The cognitive controller 305 may receive natural language inquiries, distribute classified inquiries to cognitive workers, aggregate responses from the cognitive workers, and provide scored answers to the received inquiries, as described herein. The data communication network 310 may be a high speed and high bandwidth packet switched telecommunications network configured to facilitate the exchange to data (e.g., inquiries and responses to inquiries) between cognitive controller 305 and the content providers 315A to 315N.

The content providers 315A through 315N may be entities that produce and/or manage content repositories. A content provider, for example, may be a local government, while the managed content repository may be a database of information about the local population, including names, social security numbers, addresses and criminal records. The content providers 315A to 315N may include virtual corpus components 316A and 316N. Virtual corpus components 316A and 316N may further include cognitive workers 320A through 320N, and content repository 325A through 325N. The content providers 315A through 315N may manage one or more components of the virtual corpus 316A and 316N of the distributed CCS 300. The content providers 315A through 315N may, for example, create a content access criteria for determining whether cognitive workers 320A through 320N may associate with, or disassociate (e.g., deregister) from, cognitive controller 305, thus dictating whether the distributed CCS 300 may have access to virtual corpus components 316A through 316N.

In some embodiments, the content access criteria may restrict the type of inquiries a cognitive worker associated with a cognitive controller can process. The content access criteria may restrict access to virtual corpus components 316A and 316N to limit the use of content repositories 325A through 325N (or the corpus derived from the repositories) in formulating solutions to inquiries received by distributed CCS 300.

Referring back to the local government example, a content access criteria governing access to the local population content repository via a cognitive worker may dictate that a cognitive worker may associate with a cognitive controller only when the distributed CCS is processing inquiries received from a government entity. In another embodiment, a content access criteria may dictate that a cognitive worker may only process inquiries that do not require access to the names and address of individuals in the local population.

Figure 4:
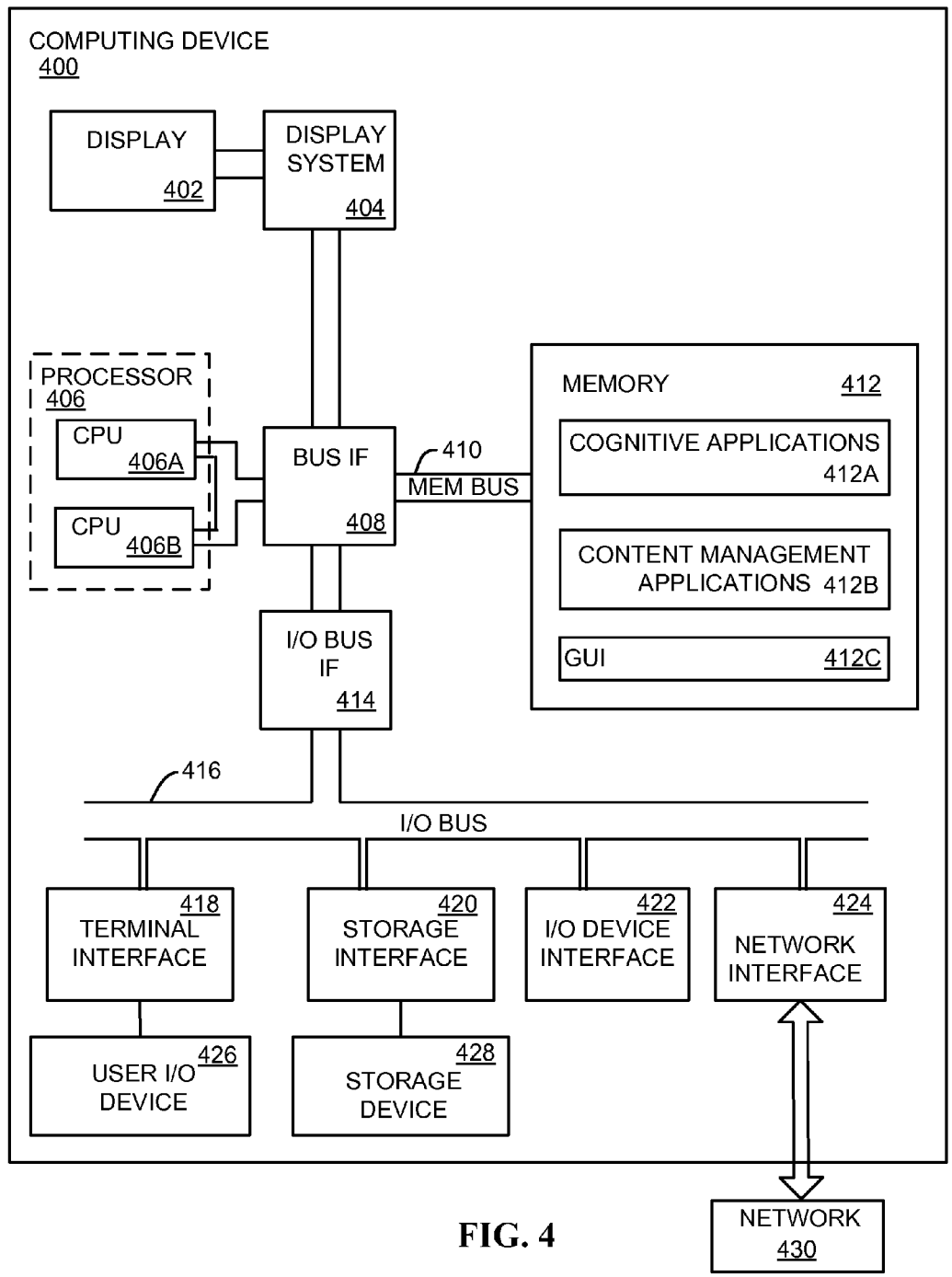
FIG. 4 is a block diagram illustrating an embodiment of a computing device that includes a memory and processor for implementing and executing the architecture for cognitive computing system having a distributed virtual corpus, according to various embodiments.

FIG. 4 is a block diagram illustrating an embodiment of a computing device 400 that includes a memory and processor for implementing and executing the architecture for cognitive computing system having a distributed virtual corpus, according to various embodiments. The components of the computing device 400 can include one or more processors 406, a memory 412, a terminal interface 418, a storage interface 420, an Input/Output ("I/O") device interface 422, and a network interface 424, all of which are communicatively coupled, directly or indirectly, for inter-component communication via a memory bus 410, an I/O bus 416, bus interface unit ("IF") 408, and an I/O bus interface unit 414.

The computing device 400 may include one or more general-purpose programmable central processing units (CPUs) 406A and 406B, herein generically referred to as the processor 406. In certain embodiments, a processor may be any electronic device having a datapath for executing a sequence of programmed instructions and capable of performing arithmetic logic computations (e.g., using an arithmetic logic unit), include application specific integrated circuits, and field programmable gate arrays. In an embodiment, the computing device 400 may contain multiple processors; however, in another embodiment, the computing device 400 may alternatively be a single CPU device. Each processor 406 executes instructions stored in the memory 412.

The computing device 400 may include a bus interface unit 408 to handle communications among the processor 406, the memory 412, the display system 404, and the I/O bus interface unit 414. The I/O bus interface unit 414 may be coupled with the I/O bus 416 for transferring data to and from the various I/O units. The I/O bus interface unit 414 may communicate with multiple I/O interface units 418, 420, 422, and 424, which are also known as I/O processors (IOPs) or I/O adapters (IOAs), through the I/O bus 416. The display system 404 may include a display controller, a display memory, or both. The display controller may provide video, audio, or both types of data to a display device 402. The display memory may be a dedicated memory for buffering video data. The display system 404 may be coupled with a display device 402, such as a standalone display screen, computer monitor, television, a tablet or handheld device display, or another other displayable device. In an embodiment, the display device 102 may include one or more speakers for rendering audio. Alternatively, one or more speakers for rendering audio may be coupled with an I/O interface unit. In alternate embodiments, one or more functions provided by the display system 404 may be on board an integrated circuit that also includes the processor 406. In addition, one or more of the functions provided by the bus interface unit 408 may be on board an integrated circuit that also includes the processor 406.

The I/O interface units support communication with a variety of storage and I/O devices. For example, the terminal interface unit 418 supports the attachment of one or more user I/O devices, which may include user output devices (such as a video display devices, speaker, and/or television set) and user input devices (such as a keyboard, mouse, keypad, touchpad, trackball, buttons, light pen, or other pointing devices). A user may manipulate the user input devices using a user interface, in order to provide input data and commands to the user I/O device 426 and the computing device 400, may receive output data via the user output devices. For example, a user interface may be presented via the user I/O device 426, such as displayed on a display device, played via a speaker, or printed via a printer.

The storage interface 420 supports the attachment of one or more disk drives or direct access storage devices 428 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 428 may be implemented via any type of secondary storage device. The contents of the memory 412, or any portion thereof, may be stored to and retrieved from the storage device 428 as needed. The I/O device interface 422 provides an interface to any of various other I/O devices or devices of other types, such as printers or fax machines. The network interface 424 provides one or more communication paths from the computing device 400 to other digital devices and computer systems.

Although the computing device 400 shown in FIG. 4 illustrates a particular bus structure providing a direct communication path among the processors 406, the memory 412, the bus interface 408, the display system 404, and the I/O bus interface unit 414, in alternative embodiments the computing device 400 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 414 and the I/O bus 408 are shown as single respective units, the computing device 400, may include multiple I/O bus interface units 414 and/or multiple I/O buses 416. While multiple I/O interface units are shown, which separate the I/O bus 416 from various communication paths running to the various I/O devices, in other embodiments, some or all of the I/O devices are connected directly to one or more system I/O buses.

In various embodiments, the computing device 400 is a multi-user mainframe computer system, a single-user system, or a server computer or similar device that has little or no direct user interface, but receives requests from other computer systems (clients). In other embodiments, the computing device 400 may be implemented as a desktop computer, portable computer, laptop or notebook computer, tablet computer, pocket computer, telephone, smart phone, or any other suitable type of electronic device.

In an embodiment, the memory 412 may include a random-access semiconductor memory, storage device, or storage medium (either volatile or non-volatile) for storing or encoding data and programs. In another embodiment, the memory 412 represents the entire virtual memory of the computing device 400, and may also include the virtual memory of other computer systems coupled to the computing device 400 or connected via a network 430. The memory 412 may be a single monolithic entity, but in other embodiments the memory 412 may include a hierarchy of caches and other memory devices. For example, memory may exist in multiple levels of caches, and these caches may be further divided by function, so that one cache holds instructions while another holds non-instruction data, which is used by the processor. Memory 412 may be further distributed and associated with different CPUs or sets of CPUs, as is known in any various so-called non-uniform memory access (NUMA) computer architectures.

The memory 412 may store all or a portion of the components and data shown in FIGS. 1-3. In particular, the memory 412 may store cognitive applications 412A, and content management applications 412B along with other modules, scripts and library components used to implement the methods of the present disclosure. The cognitive applications 412A may be a cognitive controller or a cognitive worker application that may be configured to execute the operations of the cognitive controllers and the cognitive workers that are described herein. The content management applications 412B may include content provider scripts and applications for facilitating access to content repositories and the virtual corpus components of a distributed CSS, as described herein. The memory 412 may also include a graphical user interface (GUI) 412C for interfacing with the cognitive applications 412A and the content management applications 412B. These programs and data structures are illustrated in FIGS. 1-3 as being included within the memory 412 in the computing device 400; however, in other embodiments, some or all of them may be on different computer systems and may be accessed remotely, e.g., via a network 430. The computing device 400 may use virtual addressing mechanisms that allow the programs of the computing device 400 to behave as if they only have access to a large, single storage entity instead of access to multiple, smaller storage entities. Thus, while the components and data shown in FIGS. 1-3 are illustrated as being included within the memory 412, these components and data are not necessarily all completely contained in the same storage device at the same time. Although the components and data shown in FIGS. 1-3 are illustrated as being separate entities, in other embodiments some of them, portions of some of them, or all of them may be packaged together.

In an embodiment, the components and data shown in FIGS. 1-3 may include instructions or statements that execute on the processor 406 or instructions or statements that are interpreted by instructions or statements that execute the processor 406 to carry out the functions as further described below. In another embodiment, the components shown in FIGS. 1-3 may be implemented in hardware via semiconductor devices, chips, logical gates, circuits, circuit cards, and/or other physical hardware devices in lieu of, or in addition to, a processor-based system. In an embodiment, the components shown in FIGS. 1-3 may include data in addition to instructions or statements.

FIG. 4 is intended to depict representative components of the computing device 400. Individual components, however, may have greater complexity than represented in FIG. 4. In FIG. 4, components other than or in addition to those shown may be present, and the number, type, and configuration of such components may vary. Several particular examples of additional complexity or additional variations are disclosed herein; these are by way of example only and are not necessarily the only such variations. The various program components illustrated in FIG. 4 may be implemented, in various embodiments, in a number of different ways, including using various computer applications, routines, components, programs, objects, modules, data structures etc., which may be referred to herein as "software," "computer programs," or simply "programs."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for controlled sharing, in a cognitive computing system having a memory and a processor, of content from a variety of content providers, comprising:
   receiving, by the cognitive computing system, an inquiry, wherein the inquiry is directed to at least one content topic;
   identifying, by the cognitive computing system, the at least one content topic;
   determining, by the cognitive computing system, that a cognitive component of the cognitive computing system managed by a content provider has access to a content repository addressing the at least one content topic, wherein the content provider controls access to the content repository according to an access control agreement;
   determining, by the cognitive computing system in response to the at least one topic and the agreement, that the cognitive component can address the inquiry;
   distributing, by the cognitive computing system in response to determining that the cognitive component can address the inquiry, the inquiry to the cognitive component;
   receiving a response from the cognitive component;
   processing the response to generate an answer to the inquiry;
   determining that a first confidence score associated with the response from the cognitive component is below a threshold value;
   determining that one or more cognitive components, not associated with the cognitive computing system, has access to a content repository addressing the at least one content topic and can provide a response having a second confidence score, the second confidence score being larger than the first confidence score; and
   associating the one or more cognitive components with the cognitive computing system.

2. The method of claim 1, wherein the cognitive component is able to respond to inquiries directed to content topics addressed by the content repository according to a content access restrictions determined by the content provider.

3. The method of claim 1, wherein identifying the at least one content topic comprises:
   segmenting the inquiry into a set of sub-inquiries; and
   identifying, for a sub-inquiry in the set of sub-inquiries, a set of topics addressed by the inquiry.

4. The method of claim 1,
   wherein the associating the one or more cognitive components with the cognitive computing system includes receiving from each cognitive component of the one or more cognitive components a set of topics, the each cognitive component being able to respond to inquiries directed to one or more topics in the set of content topics.

5. The method of claim 1, wherein the receiving the response from the cognitive component comprises:
   receiving one or more responses from the one or more cognitive components; and
   aggregating the one or more responses to form a response to the inquiry.

6. The method of claim 1, wherein the determining that the cognitive component can address the inquiry comprises:
   identifying second and third cognitive components that can respond to inquiries directed to the at least one content topic;
   determining that the second cognitive component has priority over the third cognitive component; and
   selecting, based on determining that the second cognitive component has priority, the second cognitive component to respond to inquiries directed to the at least one content topic.

7. The method of claim 6, wherein the priority is determined according to at least one of a content access criteria, a licensing agreement, and a cognitive worker's history of providing responses having threshold confidence score.

8. The method of claim 7, wherein the content access criteria includes licensing agreements.

9. The method of claim 1, wherein the cognitive component includes one or more software applications for inferring an answer to the inquiry based on the content repository.

10. A computer system, comprising:
    one or more computing nodes having a memory and a processor; and
    a computer readable storage medium of the one or more computing nodes having program instructions embodied therewith, the program instructions executable by the processor to cause the computer system to:
    receive an inquiry, wherein the inquiry is directed to at least one content topic;
    identify the at least one content topic;
    determine that a cognitive component of the computer system managed by a content provider has access to a content repository addressing the at least one content topic, wherein the content provider restricts access to the content repository according to an agreement;
    determine, in response to the at least one topic and the agreement, that the cognitive component can address the inquiry;
    distribute, in response to determining that the cognitive component can address the inquiry, the inquiry to the cognitive component;
    receive a response from the cognitive component;
    process the response to generate an answer to the inquiry;
    determine that a first confidence score associated with the response from the cognitive component is below a threshold value;
    determine that one or more cognitive components, not associated with the computer system, has access to a content repository addressing the at least one content topic and can provide a response having a second confidence score, the second confidence score being larger than the first confidence score; and
    associate the one or more cognitive components with the computer system.

11. The computer system of claim 10, wherein the cognitive component is able to respond to inquiries directed to content topics addressed by the content repository according to a content access restrictions determined by the content provider.

12. The computer system of claim 10, wherein the program instructions executable by the processor further cause the computer system to:
    segment the inquiry into a set of sub-inquiries; and
    identify, for a sub-inquiry in the set of sub-inquiries, a set of topics addressed by the inquiry.

13. The computer system of claim 10,
    wherein the associating the one or more cognitive components with the computer system includes receiving from each cognitive component of the plurality of cognitive components a set of topics, the each cognitive component being able to respond to inquiries directed to one or more topics in the set of content topics.

14. The computer system of claim 10, wherein the program instructions executable by the processor further cause the computer system to:
    receive one or more responses from the one or more cognitive components; and
    aggregate the one or more responses to form a response to the inquiry.

15. The computer system of claim 10, wherein the program instructions executable by the processor further cause the computer system to:
    identify second and third cognitive components that can respond to inquiries directed to the at least one content topic;
    determine that the second cognitive component has priority over the third cognitive component; and
    select, based on determining that the second cognitive component has priority, the second cognitive component to respond to inquiries directed to the at least one content topic.

16. The computer system of claim 10, wherein the cognitive component includes one or more software applications for inferring an answer to the inquiry based on the content repository.

17. A computer program product for controlled sharing, in a cognitive computing system having a memory and a processor, of content from a variety of content providers, the computer program product including a computer readable storage medium having program instructions embodied therewith, wherein the computer readable storage medium is not a transitory signal per se, the program instructions executable by a processing circuit to cause the processing circuit to perform a method comprising:
    receiving, by the cognitive computing system, an inquiry, wherein the inquiry is directed to at least one content topic;
    identifying, by the cognitive computing system, the at least one content topic;

determining, by the cognitive computing system, that a cognitive component of the cognitive computing system managed by a content provider has access to a content repository addressing the at least one content topic, wherein the content provider controls access to the content repository according to an access control agreement;

determining, by the cognitive computing system in response to the at least one topic and the agreement, that the cognitive component can address the inquiry;

distributing, by the cognitive computing system in response to determining that the cognitive component can address the inquiry, the inquiry to the cognitive component;

receiving a response from the cognitive component;

processing the response to generate an answer to the inquiry;

determining that a first confidence score associated with the response from the cognitive component is below a threshold value;

determining that one or more cognitive components, not associated with cognitive computing system, has access to a content repository addressing the at least one content topic and can provide a response having a second confidence score, the second confidence score being larger than the first confidence score; and associating the one or more cognitive components with the cognitive computing system.

18. The computer program product of claim 17, wherein the cognitive component is able to respond to inquiries directed to content topics addressed by the content repository according to a content access control restriction determined by the content provider.

* * * * *